United States Patent Office 3,539,640
Patented Nov. 10, 1970

3,539,640
THERMAL STABILIZATION OF SATURATED LINEAR POLYESTERS WITH SUBSTITUTED ALKANES AND ALKANOLS
Mary J. Stewart, Riddlewood, and Otto K. Carlson, Marcus Hook, Pa., assignors to FMC Corporation, Philadelphia, Pa., a corporation of Delaware
No Drawing. Filed Nov. 22, 1967, Ser. No. 684,917
Int. Cl. C08g 51/58
U.S. Cl. 260—45.95                                   7 Claims

ABSTRACT OF THE DISCLOSURE

A thermal stabilized polyester composition comprising a saturated linear polyester resin containing an additive selected from the group consisting of those represented by the formulas:

(1) 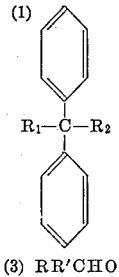    (2) 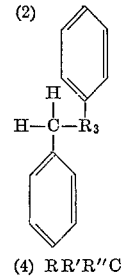

(3) RR′CHOH          (4) RR′R″COH wherein $R_1$ is hydrogen, lower alkyl, lower alkyl-phenyl, or phenyl-lower alkyl, $R_2$ is hydrogen, lower alkyl, monohydroxy substituted lower alkyl, or a hydroxyl radical, $R_3$ is a substituent selected from the group consisting of —$CH_2$— and —CHOH—, R, R′, and R″ are lower alkyl radicals and each of the additives represented by Formulas 3 and 4 above contain a total of 5 to 8 carbon atoms.

---

This invention relates to highly polymeric saturated linear polyester resins that possess improved thermal stability and to a method of producing same.

Saturated linear polyester resins can be prepared by first carrying out a condensation reaction between a suitable dicarboxylic acid or ester thereof with a diol to form a prepolymer. The resulting prepolymer is then polycondensed to form the desired polyester resin. When an ester of a dicarboxylic acid is used as the starting material, it is first reacted with a diol in the presence of a transesterification or ester-interchange catalyst by means of an ester-interchange reaction; whereas when a dicarboxylic acid is used as the starting material, it is first subjected to a direct esterification reaction with a diol in the presence of what is generally called a first stage additive or ether inhibitor. In either instance, the resulting reaction product, which may be generally described as a polyester prepolymer, is then polycondensed in the presence of a polycondensation catalyst to form a polyester resin.

For example, in the case of the transesterification method of preparing polyethylene terephthalate, ethylene glycol is reacted with dimethyl terephthalate to form a polyester prepolymer which is comprised mainly of bis-2-hydroxyethyl terephthalate; or in the direct esterification method, ethylene glycol is reacted with terephthalic acid to form the resulting polyester prepolymer which is then polycondensed to form the desired polyester resin.

Saturated linear polyester resins, such as polyethylene terephthalate and many others, are widely used in the production of films and fibers and the like. However, it is generally known that such polyester products degrade when exposed to heat for a substantial period of time. Such degradation is particularly a problem in the extrusion and spinning processes of the finished resins to form the above-denoted products. Additionally, the fibers produced from such resins are extensively used in the textile field and, as a result of this application, are subjected to rather extreme temperatures in the processes of washing, drying, and ironing. Therefore, it is highly desirable that the polyester resin composition possess as much stability at high temperatures as possible.

Therefore, it is an object of the present invention to prepare a highly polymeric saturated linear polyester resin composition which exhibits improved thermal stability.

Another object of the present invention is to provide a method of preparing saturated linear polyester resin exhibiting such a high degree of thermal stability.

These and other objects are accomplished in accordance with the present invention with a stabilized polyester composition comprising a saturated linear polyester resin containing an additive selected from the group consisting of those represented by the formulas:

(1) 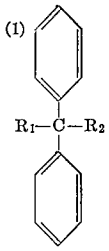    (2) 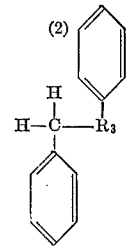

(3) RR′CHOH          (4) RR′R″COH wherein $R_1$ is hydrogen, lower alkyl, phenyl, lower alkyl-phenyl, or phenyl-lower alkyl, $R_2$ is hydrogen, lower alkyl, monohydroxy substituted lower alkyl, or a hydroxyl radical, $R_3$ is selected from the group consisting of —$CH_2$— and —CHOH—, R, R′ and R″ are lower alkyl radicals and each of the additives represented by the Formulas 3 and 4 above contain a total of 5 to 8 carbon atoms.

The term "lower alkyl" used in the above description of the thermal stabilizer additives of the present invention, is used to denote alkyl radicals having from 1 to 6 carbons. Among the additives which can be used as thermal stabilizers according to the present invention are, for example, triphenyl methane, diphenyl methane, 1,1-diphenyl butane, 1,1-diphenyl hexane, triphenyl methanol, 1,1-diphenyl-n-propanol, benzylphenyl carbinol, benzylphenyl methane, di-n-propyl carbinol, diethyl carbinol, methylisopropylcarbinol, 2-methyl-4-hexanol, diethylmethylcarbinol, dipropylmethylcarbinol, and dimethylbutylcarbinol.

The preparation of polyester via the ester-interchange reaction is generally carried out with a molar ratio of diol, such as ethylene glycol to an ester of a dicarboxylic acid, such as dimethyl terephthalate of from about 1:1 to about 15:1, respectively, but preferably from about 1.2:1 to about 2.6:1. The transesterification or ester-interchange reaction is generally carried out at atmospheric pressure in an inert atmosphere such as nitrogen, initially at a temperature ranging from about 125–250° C., but preferably between about 150° C. and 200° C. in the presence of a suitable transesterification catalyst. For example, the transesterification catalyst used may be lithium hydride or zinc acetate at a concentration ranging from about 0.01% to about 0.20%, based on the weight of the ester of the dicarboxylic acid used in the initial reaction mixture. During the first stage of this reaction, methyl alcohol is evolved and is continuously removed by distillation. After a reaction period of about 1–2 hours, the temperature of the reaction mixture is raised to from about 200° C. to about 300° C. for approximately 1–3 hours in order to complete the reaction, so as to form the desired polyester prepolymer and to distill any excess glycol.

In the case of the direct esterification method of preparing saturated linear polyester resins, the reaction is generally carried out with a molar ratio of diol, for example, ethylene glycol, with a dicarboxylic acid, such as terephthalic acid, of from about 1:1 to about 15:1, but pefrerably from about 1.2:1 to about 2.6:1. The direct esterification step is generally carried out at temperatures ranging from about 180–280° C. in the absence of an oxygen containing atmosphere at atmospheric or elevated pressure for about 2–4 hours to form the desired polyester prepolymer. For example, the reaction may be carried out in an atmosphere of nitrogen.

The first stage of the direct esterification method is generally carried out in the presence of a suitable additive or buffer, such as triethylamine, at a concentration ranging from about $5 \times 10^{-5}$ mole to about $5 \times 10^{-1}$ mole of additive per mole of dicarboxylic acid in the initial reaction mixture.

Conventionally, the polycondensation step in the preparation of the subject polyester resins by either the transesterification method or direct esterification method, is generally accomplished by adding a suitable polycondensation catalyst to the polyester prepolymer and heating the blend thereof under reduced pressure of from about 0.5 to 20 mm. of mercury while being agitated at a temperature of from about 260–325° C. for from 2–4 hours. For example, the polycondensation catalysts suitable for use are antimony trioxide and antimony sec-butoxide, at concentrations ranging from about 0.01% to about 0.2%, based on the weight of the polyester prepolymer to be polycondensed.

In the practice of the present invention, the above-defined thermal stabilizers can be incorporated in the resin composition at various stages. For example, in the preparation of polyester resin, the present thermal stabilizers can be suitably mixed in the polyester resin reactants before commencing the reaction, or at any stage after the initial reaction has begun, if indicated. However, in most instances, it has been found that it is preferred to mix or blend the present thermal stabilizers in the polyester resin immediately after the polycondensation step has been completed.

It has been found that the above-described additives are effective as thermal stabilizers in polyester resin compositions when employed in amounts ranging from about 0.01% to about 0.5%, based on the weight of the polyester resin. Usually, it has been found that concentrations ranging from about 0.02% to about 0.3% are preferred in most instances. However, when indicated, concentrations less or greater than the above can be used, but their effectiveness is generally reduced.

The following examples of several preferred embodiments will further serve to illustrate the present invention, although it will be understood that these examples are included merely for the purpose of illustration and are not intended to limit the scope of the present invention. All parts are by weight, unless otherwise indicated.

EXAMPLE I

A blended mixture comprising 474 g. of terephthalic acid, 288 mls. of ethylene glycol and 149 mls. of triethylamine was charged into a reaction vessel equipped with a nitrogen inlet, a Dean-Starke separating apparatus, heating means and stirring means. The reaction mixture was agitated and the temperature was raised to about 197° C. under a nitrogen blanket at atmospheric pressure. At about 190° C., a water-triethylamine azeotropic mixture started to distill off. The azeotropic mixture was continuously separated by means of the Dean-Starke apparatus, and the triethylamine recovered was continuously returned to the reaction vessel. The reaction mixture became almost clear. Then, the temperature was allowed to rise to about 230° C. over a one hour period to form a polyester prepolymer. The prepolymer product was allowed to cool under an atmosphere of nitrogen.

EXAMPLE II

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the polyester prepolymer and formation of a polyester resin. The polyester resin formed had an original intrinsic viscosity of 0.88, a degraded intrinsic viscosity of 0.69, and the percentage broken bonds was calculated as 0.132.

EXAMPLE III

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. At the end of the polycondensation reaction, 0.02 cc. of diphenyl methane was stirred into the polyester resin, after which the resin product was cooled. The resulting polyester resin composition had an original intrinsic viscosity of 0.77, a degraded intrinsic viscosity of 0.65, and the percentage broken bonds was calculated as 0.101.

EXAMPLE IV

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. At the end of the polycondensation reaction, 0.02 g. of triphenyl methane was stirred into the polyester resin, after which the resin product was cooled. The resulting polyester resin composition had an original intrinsic viscosity of 0.78, a degraded intrinsic viscosity of 0.64, and the percentage broken bonds was calculated as 0.109.

EXAMPLE V

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. At the end of the polycondensation reaction, 0.02 g. of triphenyl methanol was stirred into the polyester resin, after which the resin product was cooled. The resulting polyester resin composition had an original intrinsic viscosity of 0.59, a degraded intrinsic viscosity of 0.58, and the percentage broken bonds was calculated as 0.011.

EXAMPLE VI

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. At the end of the polycondensation reaction, 0.02 g. of benzylphenyl carbinol was stirred into the polyester resin, after which the resin product was cooled. The resulting polyester resin composition had an original intrinsic viscosity of 0.61, a degraded intrinsic viscosity of 0.57, and the percentage broken bonds was calculated as 0.054.

EXAMPLE VII

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. At the end of the polycondensation reaction, 0.02 cc. of di-n-propyl carbinol was stirred into the polyester resin, after which the resin product was cooled. The resulting polyester resin composition had an original intrinsic viscosity of 0.69, a degraded intrinsic viscosity of 0.61, and the percentage broken bonds was calculated as 0.084.

EXAMPLE VIII

A mixture comprising 600 g. of dimethyl terephthalate, 396 mls. of ethylene glycol, and 0.24 g. of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then, the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE IX

Fifty grams of the prepolymer product of Example VIII was mixed with 0.02 g. of antimony trioxide and placed in a reaction vessel. The reaction mixture was heated at about 280° C. under reduced pressure of from about 0.05 to about 0.1 mm. of mercury while under agitation for about 3 hours to bring about the polycondensation of the polyester prepolymer and formation of a polyester resin. The polyester resin formed had an original intrinsic viscosity of 1.13, a degraded intrinsic viscosity of 0.76, and the percentage broken bonds was calculated as 0.169.

EXAMPLE X

Fifty grams of the prepolymer of Example VIII was mixed with 0.02 g. of antimony trioxide and placed in a reaction vessel. The reaction mixture was heated at about 280° C. under reduced pressure of from about 0.05 to about 0.1 mm. of mercury while under agitation for about 3 hours to bring about the polycondensation of the polyester prepolymer and formation of a polyester resin. At the end of the polycondensation reaction, 0.02 g. of benzylphenyl carbinol was stirred into the polyester resin, after which the resin product was cooled. The polyester resin composition formed had an original intrinsic viscosity of 0.84, a degraded intrinsic viscosity of 0.66, and the percentage of broken bonds was calculated as 0.131.

In the above examples, the original intrinsic viscosity values of the polyester resin products were obtained by measuring the intrinsic viscosities of the resin compositions as produced.

The degraded intrinsic viscosity values were determined by the following procedure: The polyester resin composition was ground and passed through a 10 U.S.S. mesh screen and dried at 120° C. in vacuo for 16 hours, then cooled in a desiccator. Two to three grams of this dried resin was then placed in a test tube which was then inserted into an aluminum block preheated to 280° C. ($\pm 0.5°$ C.). The block was then sealed and evacuated to 0.1 mm. of mercury. After holding for about 10–15 seconds, the block was filled with dried, oxygen-free nitrogen gas. This vacuum-nitrogen purge was then repeated for a total of three times; the entire process took 5–7 minutes. Then, the resin sample was left in the heated block for an additional two hours under a slow stream of nitrogen. After this two-hour period, the resin sample was removed from the block and placed in a desiccator which was first evacuated and then filled with nitrogen. The intrinsic viscosity of the resin product was then determined and such an intrinsic viscosity value is noted in the example above as the degraded intrinsic viscosity.

The percentage broken bond values indicated in the above examples were calculated by the use of the following equation:

$$\text{Percent broken bonds} = \left[\left(\frac{K}{V_f}\right)^{1/a} - \left(\frac{K}{V_i}\right)^{1/a}\right] \times 9.6 \times 10^3$$

The values of K and a may be found in the literature, such as Conix, A., Makromol, Chemie 26, p. 226 (1958), wherein $K=0.00021$ and $a=0.82$. $V_f$ in the above formula is the degraded or final intrinsic viscosity value and $V_i$ is the original or initial intrinsic viscosty value.

All of the intrinsic viscosity determinations of the polyester resin products produced in the above examples were determined in a 60% phenol and 40% tetrachloroethane solution, wt./wt., at 30° C., according to conventional laboratory procedure.

The results in the above examples indicates that the present additives, when added to saturated linear polyester resins, act to stabilize or reduce the degradation effects of higher temperatures upon such polyester resins. The change in intrinsic viscosity or the difference between the original intrinsic viscosty and the degraded intrinsic viscosity in a direct measure of the heat stabilizing effect that the present thermal stabilizers have upon polyester resins and can be readily calculated from the above results.

When the controls above, Examples II and IX, are compared with their corresponding examples wherein the same catalyst systems were used, with the addition of a thermal stabilizer of the present invention, it can readily be seen from the intrinsic viscosity values and the percentage broken bonds values that the present stabilizers act in all cases to limit the amount of degradation that takes place when polyester resin products are exposed to elevated temperatures for prolonged periods of time.

The present invention has been illustrated with particular respect to the stabilization of polyethylene terephthalate. However, the present thermal stabilizers are also effective in stabilizing any saturated linear polyesters and copolyesters; for example, those derived from dicarboxylic acids, such as isophthalic acid, and 4,4'-diphenyldicarboxylic acid, or ester derivatives thereof, and suitable diols, such as glycols of the series $HO(CH_2)_nOH$, where n is 2 to 10.

It will be apparent that various different embodiments can be made practicing this invention without departing from the spirit and scope thereof, and therefore, it is not intended to be limited, except as indicated in the appended claims.

We claim:
1. A stabilized polyester composition comprising a saturated linear polyester resin having incorporated therein from about 0.01% to about 0.5%, by weight, based on the weight of said resin of a thermal stabilizer selected from the group consisting of those represented by the formulas:

(1) 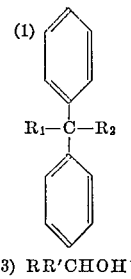 R₁—C—R₂

(2) 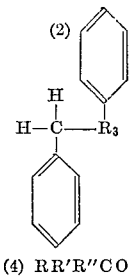 H—C—R₃ (with H above C)

(3) RR'CHOH     (4) RR'R"COH wherein $R_1$ is hydrogen, lower alkyl, lower alkyl-phenyl, or phenyl-lower alkyl, $R_2$ is hydrogen, lower alkyl, monohydroxy substituted lower alkyl, or a hydroxyl radical, $R_3$ is selected from the group consisting of —CH₂— and —CHOH—, R, R', and R" are lower alkyl radicals and each of the additives represented by Formulas 3 and 4 above contain a total of 5 to 8 carbon atoms.

2. The composition of claim 1 wherein the polyester resin is polyethylene terephthalate.

3. The composition of claim 1 wherein the stabilizer is diphenyl methane.

4. The composition of claim 1 wherein the stabilizer is benzylphenyl carbinol.

5. The composition of claim 1 wherein the stabilizer is di-n-propyl carbinol.

6. The composition of claim 1 wherein the stabilizer is 1,1-diphenyl hexane.

7. The composition of claim 1 wherein the stabilizer is benzylphenyl methane.

References Cited

UNITED STATES PATENTS

| | | | |
|---|---|---|---|
| 2,755,261 | 7/1956 | Clark | 260—45.95 |
| 2,841,569 | 7/1958 | Rugg et al. | 260—45.7 |
| 2,957,848 | 10/1960 | Lotz | 260—45.7 |
| 3,089,860 | 5/1963 | Baum et al. | 260—45.7 |
| 3,208,859 | 9/1965 | Coffield | 260—45.7 |

HOSEA E. TAYLOR, Jr., Primary Examiner

U.S. Cl. X.R

260—45.7